R. S. WILLIAMS.
SHOCK ABSORBER.
APPLICATION FILED APR. 21, 1917.
1,244,814. Patented Oct. 30, 1917.
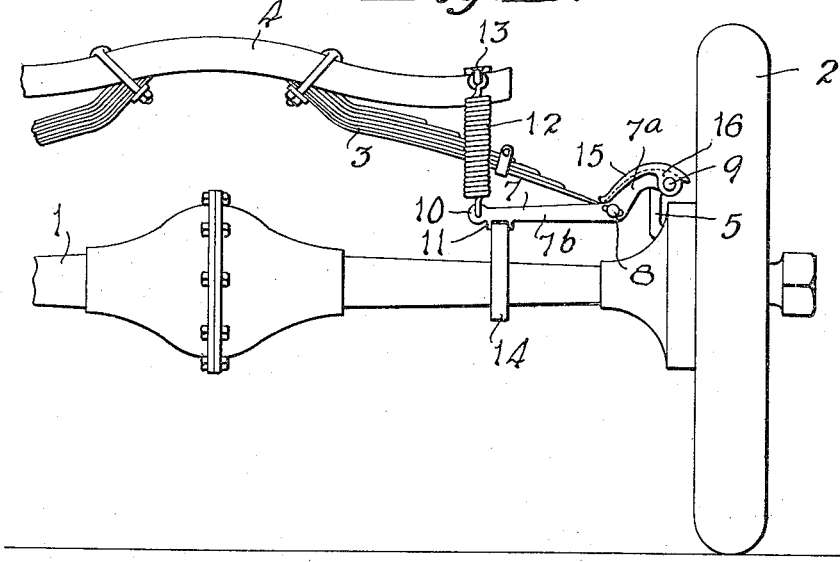
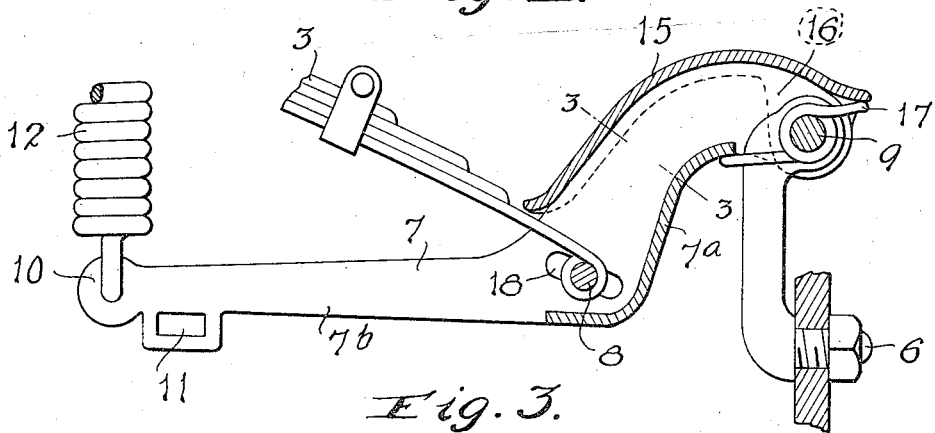
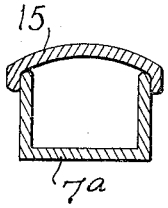
Inventor
ROBERT SEARS WILLIAMS
By H. S. Hie
Attorney

UNITED STATES PATENT OFFICE.

ROBERT SEARS WILLIAMS, OF TEXARKANA, TEXAS.

SHOCK-ABSORBER.

1,244,814.  Specification of Letters Patent.  Patented Oct. 30, 1917.

Application filed April 21, 1917. Serial No. 163,714.

*To all whom it may concern:*

Be it known that I, ROBERT SEARS WILLIAMS, a citizen of the United States, residing at Texarkana, in the county of Bowie, State of Texas, have invented a new and useful Shock-Absorber; and I do hereby declare the following to be a full, clear, and exact description of the invention, such as will enable others skilled in the art to which it appertains to make and use the same.

The present invention relates to a shock absorber for motor vehicles, and has for its object to provide a device of this character which is especially designed for use in connection with those vehicles in which the main springs extend transversely of the vehicle body, and which embodies novel features of construction whereby sudden and excessive shocks and jars will be broken and absorbed, thereby enabling the vehicle to ride much easier than would otherwise be possible.

Further objects of the invention are to provide a shock absorber which is comparatively simple and inexpensive in its construction, which can be readily applied to conventional types of vehicles without necessitating any changes in the construction thereof, which is not liable to become collected with accumulations of mud and dirt, and which will operate in a most effective manner to absorb sudden shocks and jars and prevent excessive rebound.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a fragmentary rear elevation of an automobile chassis, showing a shock absorber constructed in accordance with the invention applied thereto.

Fig. 2 is a vertical longitudinal sectional view through the shock absorber.

Fig. 3 is a transverse sectional view on the line 3—3 of Fig. 2.

Corresponding and like parts are referred to in the following description and indicated in all the views of the drawings by the same reference characters.

For the purpose of illustration the shock absorber is shown as applied to a conventional type of motor vehicle of which fragmentary portions only are illustrated, the numeral 1 designating the rear axle, 2 the rear wheels, 3 the transversely disposed rear spring, and 4 the rear cross bar of the main frame. A perch 5 projects upwardly from each end of the rear axle 1, being shown as rigidly secured in position by suitable fastening means such as the bolt 6. A lever 7 is provided at each end of the rear spring 3, said lever being formed with two angularly disposed arms $7^a$ and $7^b$ which are pivotally connected at their intersection by a pivot bolt 8 to the end of the spring 3. The arm $7^a$ of each lever is channel shaped in cross section, while the arm $7^b$ is bifurcated, the two halves thereof forming continuations of the side flanges of the channel shaped arm $7^a$ and straddling the vehicle spring 3. It will also be observed that the arm $7^a$ is curved upwardly and outwardly, being pivotally connected at its extremity by means of a pivot bolt 9 to the upper end of the perch 5. The arm $7^b$ of each lever extends under the end of the vehicle spring 3, the two halves thereof each terminating in an eye 10 and a slot 11. These eyes 10 engage the lower ends of upwardly extending tension springs 12, said tension springs being arranged upon opposite sides of the vehicle spring 3, and being connected at their abutting ends to a hanger 13 which is applied to the rear cross bar 4 of the main vehicle frame. The slots 11 engage the ends of a rebound strap 14 which extends downwardly around the axle 1 of the vehicle and operates to prevent excessive rebound thereof.

A mud guard 15 is mounted to extend over the upper face of the channel shaped outer arm $7^a$ of each of the shock absorbing levers 7, thereby preventing mud and dirt from accumulating around the pivot bolts 8 and 9 in such a manner as to interfere with the freedom of movement at the pivot points and detract from the efficiency of the device as a shock absorber. This mud guard 15 is transversely curved so as to readily shed mud and water, and is bent longitudinally to conform to the general shape of the lever arm $7^a$. The longitudinal edges of the mud guard slightly overhang the sides of the lever so that there will be no danger of mud and water accumulating within the channel shaped lever and causing rusting and corrosion of the parts, as well as interfering with the freedom of movement thereof. The outer end of the mud guard may be provided with laterally projecting ears 16 which engage the ends of the pivot bolt 9. If desired, a spring 17 may be provided for swinging the free end of the mud guard downwardly into operative position, at the same time enabling it to be swung upwardly when it is desired to obtain access to the parts for oiling the pivotal connections. The pivot bolt 8 preferably has the ends thereof received within slots 18 in the side flanges of the lever 7, thereby providing a limited movement of play and preventing undue strain upon the parts when there is an unusually heavy rebound of the vehicle body. This construction avoids the necessity of using a shackle, and the arrangement of the levers is such that the resiliency of the main spring 4 will be supplemented by that of the tension springs 12, thereby causing all sudden shocks and jars to be effectively absorbed and imparting easy riding qualities to the vehicle.

Having thus described the invention, what I claim as new and desire to secure by Letters Patent, is:—

1. A shock absorber for vehicles having transversely disposed springs, including a perch rigid with the axle and projecting upwardly therefrom, a lever formed with two arms which are arranged at an angle to each other, the outer arm being formed with side flanges and having a channel shaped cross section, while the inner arm is bifurcated and the halves thereof form continuations of the flanges of the outer arm, a pivot bolt connecting the end of the spring to the lever at the intersection of its angularly disposed arms, the outer arm being pivotally connected to the perch, while the inner arm extends under the vehicle spring, and tension springs connecting the two halves of the bifurcated inner arm to the vehicle frame.

2. A shock absorber for vehicles having transversely disposed springs, including a perch rigid with the axle and projecting upwardly therefrom, a lever having the same direction as the spring and pivotally connected at an intermediate point in its length to the extremity of the spring, the outer end of the lever extending beyond the end of the spring and being pivotally connected to the perch, a tension spring connecting the inner end of the lever to the vehicle frame, and a mud guard applied to the lever and extending over the pivotal connections thereof to exclude accumulations of mud and dirt.

3. A shock absorber for vehicles having transversely disposed springs, including a perch rigid with the axle and projecting upwardly therefrom, a lever having the same direction as the spring and pivotally connected at an intermediate point in its length to the extremity of the spring, a pivot bolt connecting the outer end of the lever to the perch, the inner end of the lever extending under the spring, a tension spring connecting the inner end of the lever to the vehicle frame, and a mud guard mounted upon the before mentioned pivot bolt and projecting over the outer arm of the lever to exclude accumulations of mud and dirt from the pivotal connections thereof.

4. A shock absorber for vehicles having transversely disposed springs, including a perch rigid with the axle and projecting upwardly therefrom, a lever formed with two arms which are arranged at an angle to each other, the outer arm having a channel shaped cross section and the inner arm being bifurcated to straddle the vehicle spring, a pivot bolt connecting the end of the vehicle spring to the lever at the intersection of its angularly disposed arms, a second pivot bolt connecting the outer end of the lever to the perch, tension springs connecting the bifurcated inner end of the lever to the vehicle frame, and a mud guard extending longitudinally over the channel shaped outer arm of the lever, the outer end of the mud guard being formed with ears which engage the pivot bolt of the perch.

In testimony whereof I have signed my name to this specification in the presence of two subscribing witnesses.

ROBERT SEARS WILLIAMS.

Witnesses:
T. J. MAY,
J. R. WALLINGTON.

Copies of this patent may be obtained for five cents each, by addressing the "Commissioner of Patents, Washington, D. C."